March 19, 1968   J. C. SIMONS, JR   3,373,597
VACUUM CALIBRATION APPARATUS
Filed June 23, 1965   2 Sheets-Sheet 1

INVENTOR
JOHN C. SIMONS, JR.

BY *Rines and Rines*

ATTORNEYS 3,373,597
VACUUM CALIBRATION APPARATUS
John C. Simons, Jr., 206 Conant Road,
Weston, Mass. 02193
Filed June 23, 1965, Ser. No. 466,269
20 Claims. (Cl. 73—4)

ABSTRACT OF THE DISCLOSURE

Apparatus for calibration of vacuum gages to as low as $10^{-7}$ torr. The device consists of a series of chambers interconnected through a series of accurately defined orifices. Each chamber is connected to a diffusion pump of known capacity. Thus if the pumping rate, orifice size and pressure in the preceding chamber are known the pressure in any given chamber can be readily computed. A knife edged slot orifice is utilized because of its predictable effect upon the molecular flow between chambers. Means are provided to change the range of pressure in any chamber.

---

Figure 1:
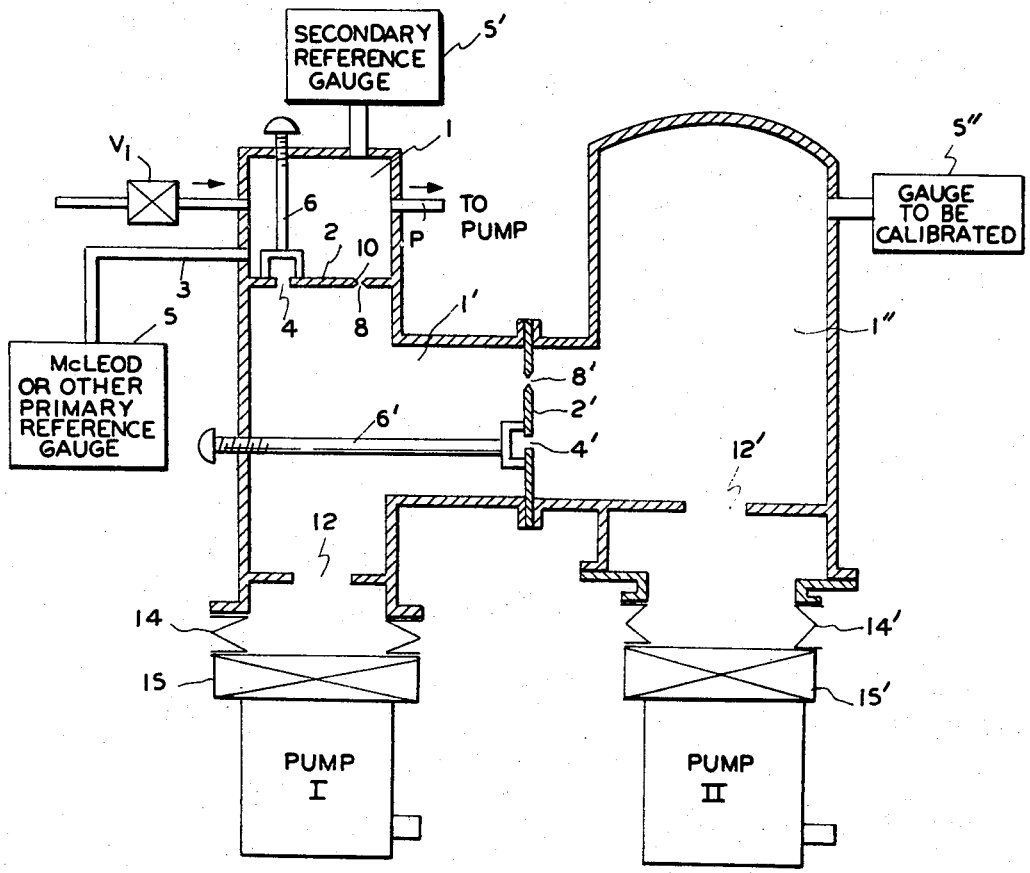

The present invention relates to vacuum calibration apparatus and, more particularly, though not exclusively, to a cascaded plurality of successively lower-pressure chambers, each employed to drive the next successive chamber to achieve pressure reduction in order to enable calibration of low-pressure-measuring gauges from a standard higher-pressure reference gauge disposed in a relatively higher pressure-range chamber within which range, but not therebelow, the reference gauge provides an accurate measurement of pressure, as described by J. C. Simons, Jr., et al. in an article entitled, "Accurate Calibration of Vacuum Gauges to $10^{-9}$ torr," appearing in the Transactions, 1961 American Vacuum Society Symposium (Pergamon Press, Oxford, 1962) vol. 1, pp. 511–18.

In cascaded chamber apparatus of the above-described and related types, substantially circular apertures of known diameter are provided in relatively thick chamber-dividing plates to enable coupling of the gas under pressure between the successive chambers. It is essential for the above purposes that the dimensions and behavior of the apertures be accurately known and predetermined, since they control the pressure reduction ratio between successive chambers, and that mass flow of the gas between chambers through the apertures be directly proportional and thus linearly related to the pressure. Assuming such linear mass-flow coupling operation, one can theoretically obtain the value of the pressure reduction ratio between successive chambers. Above a predetermined threshold pressure $p_t$, however, the flow becomes non-linear as molecular collisions become significant, and the calibration system no longer is accurate in that the calculated pressure reduction ratio no longer obtains. This phenomenon occurs when the so-called Knudsen number approaches unity or lower (i.e., the ratio between the mean free path in the gas and some controlling cross-dimension of the aperture, such as the diameter, in the case of prior-art substantially circular apertures).

An object of the present invention is to provide a new and improved apparatus of the character described in which novel inter-chamber coupling orifice constructions are provided that retain the linear mass-flow operation for significantly higher threshold pressures $p_t$ than prior-art circular and related apertures and thus in ranges where reference gauges are highly accurate.

A further object is to provide improved pressure coupling orifices of more general utility, as well.

Still another object is to provide a novel vacuum gauge calibration apparatus.

Other and further objects will be explained hereinafter and will be more particularly pointed out in the appended claims. In summary, however, the invention provides, not only in said cascaded type of calibration systems, but more generally, a novel inter-chamber coupling orifice of elongated narrow construction, the peripheral edges of which are substantially knife-like to provide extreme thinness thereat, and further preferred constructional features of which are later set forth in detail.

Figure 2:
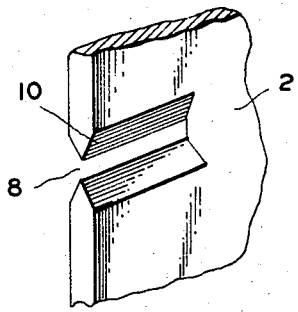
Figure 3:
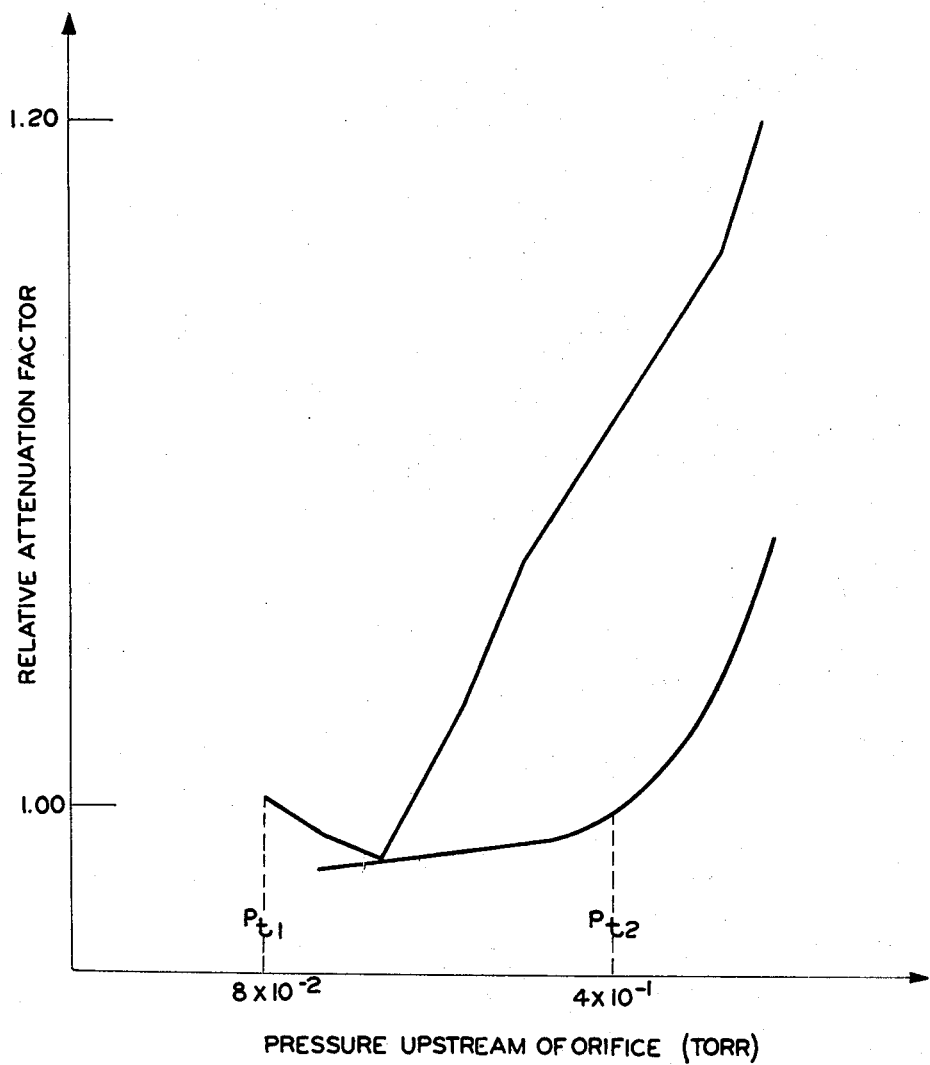

The invention will now be described in conjunction with the accompanying drawing, FIG. 1 of which is a schematic diagram, shown partially in longitudinal section, of a preferred vacuum apparatus embodying features of the invention;

FIG. 2 is a fragmentary isometric view of the coupling orifice portion of chamber separator walls of FIG. 1, upon an enlarged scale; and FIG. 3 is a graph comparing the performance of a commercial embodiment similar to FIG. 1 with prior-art apparatus of the above-described type.

Referring to FIG. 1, a first relatively high pressure-range chamber 1 (say in the range of from about $3 \times 10^{-1}$ to $10^{-3}$ torr, as an illustration) is shown connected at 3 to a primary reference or standard gauge 5, such as a McLeod or similar gauge of high accuracy in such relatively high pressure range. If desired, in order to enable more rapid measurements than the McLeod gauge can provide with accuracy, a secondary reference gauge 5', such as a radioactive ionization gauge with more facile electronic measurement properties, may be calibrated from the McLeod or other primary reference gauge 5 and may also be employed in the high-pressure chamber 1. The input gas flow is controlled and maintained by valve $V_1$ and the chamber 1 is exhausted at pump region P. Thus, accurate standard reference measurements in the relatively high pressure range thus maintained in chamber 1 is effected.

Cascaded with the chamber 1 is a plurality of successive lower pressure-range chambers 1' and 1", each divided from its preceding chamber by respective separator walls 2 and 2'. The separator walls 2 and 2' are provided with respective ports 4 and 4', selectively closable by valve plungers 6 and 6'. With the ports closed off, the separator walls 2 and 2' are opaque to gas interchange between adjacent chambers except through critically designed orifices 8 and 8', respectively.

In accordance with the invention, the inter-chamber coupling orifices 8 and 8' are elongated narrow slots, as more particularly shown in FIG. 2 with reference to the orifice 8 in the separator wall 2, the dimensions of which are predetermined, with the peripheral edegs reduced in sharpened knife-like fashion at 10 to extreme thinness, very small compared with the narrow dimension of the orifice (shown vertical). It has been found that with such a slot-like orifice, the threshold pressure $p_t$ at which the flow is no longer linear is controlled by the narrow slot dimension; and as large a flow area as may be advisable is simply attained by adjustment of the long dimensions. Whereas in prior-art coupling apertures, (such as, for example ⅛ to 2-inch diameter holes in stainless steel plates about ¼ inch thick) corrections (termed Clausing corrections) must be made in determination of the pressure-reduction ratio between successive chambers in view of the physical thickness of the plate or wall in which the aperture is provided, such theoretical considerations are inapplicable in the pressure range near the threshold pressure $p_t$. No such problems, however, are introduced by the slot of the present invention in view of the knife-like almost infinitely thin sharp edges 10—a constructional feature, of course, very difficult, if not practically impossible, to attain with such prior-art apertures.

The chamber 1' may be maintained substantially two pressure decades in range lower than the chamber 1 (say, from about $3 \times 10^{-3}$ to $10^{-5}$ torr) by means of a diffusion pump structure I the net speed of which is large (as of the order of at least ten times) compared with the conductance of an aperture 12 coupling the chamber 1' to the pump I, in order that the aperture 12 will be the flow-controlling element. A liquid nitrogen-cooled baffle 14 is provided between the pump I and the aperture 12 to avoid the admittance of pump-oil vapor into the chamber. The next successive chamber 1", coupled through slot orifice 8' to preceding chamber 1', may be maintained in still two lower decades of pressure range (say, from about $3 \times 10^{-5}$ to $10^{-7}$ torr) by diffusion pump II connected to the chamber 1" through the baffle 14' and aperture 12'. Clearly, further successively connected chambers and pressure stages may be employed, if desired. A low-pressure range gauge 5" is shown connected to be exposed to the pressure in the lowest pressure-range chamber 1", the successively lower pressures maintained in chambers 1' and 1" varying in tracking fashion with variations in the pressure in chamber 1. Thus, the gauge 5" can be calibrated in terms of the much higher pressure reference gauges 5 and/or 5', in the manner generally described in my said article.

Where it is desired to switch the range of calibration of one chamber to that of another, as, for example, the pressure range of chamber 1" to that of chamber 1', the port, such as port 4' is opened, as by withdrawing plunger valve 6', and the diffusion means II is closed off by valve 15', thus enabling the pressure in chamber 1" to increase into substantial equilibrium with that in chamber 1'. Thus the gauge 5" can be calibrated in the higher range of chamber 1'. The port 4 will be of much larger dimensions than that of the narrow orifice 2' to achieve this end. If desired, the port 4' could be of predetermined known dimensions, also, to enable the pressure in chamber 1" to increase only partway toward that in chamber 1', with pump II operating.

Typical dimensions found particularly suitable for operation in the above-mentioned illustrative vacuum pressure ranges include a narrow slot dimension lying within the range of from substantially a few thousandths of an inch, namely 0.003 inch (for the slot 8, for example), to substantially 0.14 inch (for the slot 8', for example) and a corresponding length dimension range of from substantially 0.55 to 1.1 inch; i.e., a ratio of length-to-width of the order of from at least substantially ten to substantially two hundred. The knife-like edges are preferably at least of the order of tenths of thousandths of an inch thin and less at their peripheral edges—at least substantially one-twentieth the narrow slot dimension in this example. Experimentally obtained data is presented in FIG. 3, comparing the vastly improved performance of the above-mentioned knife-edge 0.003 inch width orifice 8 with that of an equivalent area 0.043 inch diameter prior-art coupling aperture. The ordinate and abscissa respectively plot measured attenuation factor as a function of upstream pressure at the orifices, showing that the present invention extends the threshold pressure where the flow becomes substantially non-linear ($p_{t_2}$ at about $4 \times 10^{-1}$ torr) by a factor of at least five times the pressure ($p_{t_1}$ at about $8 \times 10^{-2}$ torr) where prior-art types of apertures become non-linear. Highly successful lower-pressure gauge calibrations have been thus attained in practice in the above-mentioned pressure ranges.

While the invention is described in connection with the cascaded successive different-pressure range chamber system, it is to be understood, as before mentioned, that the orifice coupling construction and related elements may also be used to advantage in other systems as well; and that further modifications will also occur to those skilled in the art, all such being considered to fall within the spirit and scope of the invention as defined in the appended claims.

What is claimed is:

1. Vacuum apparatus for permitting pressurized gas to flow between first and second chambers, that comprises, a separator wall disposed between the chambers provided with an elongated narrow inter-chamber gas-flow coupling orifice of predetermined dimensions the peripheral edges of which are substantially knife-like to provide a thinness therealong that is small compared with the narrow dimension of the orifice.

2. Apparatus as claimed in claim 1 and in which means is provided for maintaining the said chambers at different pressures.

3. Apparatus as claimed in claim 2 and in which there is provided reference gauge means in the chamber of higher pressure and means for exposing lower-pressure gauge means, to be calibrated with respect to the reference gauge means, to the gas within the other chamber.

4. Apparatus as claimed in claim 3 and in which the said higher pressure has a lower limit of the order of substantially $10^{-3}$ torr and the said narrow dimension is of the order of substantially thousandths of an inch.

5. Apparatus as claimed in claim 4 and in which the ratio of length-to-width of the said orifice is of the order of from at least substantially ten to substantially two hundred.

6. Apparatus as claimed in claim 1 and in which the said narrow dimension lies within the range of from substantially 0.003 inch to substantially 0.14 inch.

7. Apparatus as claimed in claim 6 and in which the length of the said orifice lies within the range of from substantially 0.55 inch to substantially 1.1 inch.

8. Apparatus as claimed in claim 1 and in which the knife-like edges are at least as thin as substantially tenths of thousandths of an inch.

9. Apparatus as claimed in claim 1 and in which the knife-like edge thinness is at most of the order of substantially one-twentieth the said narrow dimension.

10. Vacuum apparatus for calibrating gas pressure over a plurality of successively lower pressure ranges, that comprises, a plurality of successive chambers each separated from a preceding chamber by a wall provided with an elongated narrow inter-chamber gas-flow coupling orifice of predetermined dimensions the peripheral edges of which are substantially knife-like to provide a thinness therealong that is small compared with the narrow dimension of the orifice, and means for maintaining the successive chambers at the said successive lower pressure ranges.

11. Apparatus as claimed in claim 10 and in which there is provided reference gauge means in a first of the chambers of relatively high pressure range and means for exposing lower-pressure gauge means, to be calibrated with respect to the reference gauge means, to the gas within other relatively lower-pressure range chambers.

12. Apparatus as claimed in claim 11 and in which means is provided for increasing the pressure in one of the lower-pressure-range chambers to substantial equilibrium with that of a preceding chamber to switch the range of calibration of the gauge means to be calibrated in the said one chamber to substantially that of the said preceding chamber.

13. Apparatus as claimed in claim 12 and in which the said pressure increasing means comprises valve means for selectively opening a port in the wall between said one chamber and its said preceding chamber.

14. Apparatus as claimed in claim 13 and in which said port is of dimensions large compared with the said orifice.

15. Apparatus as claimed in claim 11 and in which said maintaining means comprises diffusion-pump means connected with each of the said plurality of chambers.

16. Apparatus as claimed in claim 15 and in which the connection of each diffusion-pump means with the corresponding chamber is effected through aperture means large compared with the said orifice but small enough with respect to the speed of the diffusion pump to control the flow at the said aperture.

17. Apparatus as claimed in claim 15 and in which means is provided for varying the pressure of gas applied to the apparatus correspondingly to cause the pressure within the successive lower-pressure range chambers to track with the variation of pressure.

18. Apparatus as claimed in claim 10 and in which the maintaining means is adjusted such that each of a plurality of said chambers provides a pressure range substantially two decades lower than the preceding chamber.

19. Vacuum apparatus for calibrating gas pressure over a plurality of successively lower pressure ranges, that comprises, a plurality of successive chambers each separated from a preceding chamber by a wall provided with a gas-flow coupling orifice of predetermined dimensions, means for maintaining the successive chambers at the said successive lower pressure ranges, reference gauge means disposed in a first of the chambers of relatively high pressure range, means for exposing lower-pressure gauge means to be calibrated with respect to the reference gauge means to the gas within one of the relatively lower-pressure-range chambers, and means separate from said orifice for increasing the pressure in the said one of the lower-pressure-range chambers to substantial equilibrium with that of a preceding chamber to switch the range of calibration of the gauge means to be calibrated in the said one chamber to substantially that of the said preceding chamber.

20. Apparatus as claimed in claim 19 and in which the said pressure increasing means comprises valve means for selectively opening a port in the wall between said one chamber and its said preceding chamber.

References Cited

Roehrig et al.: 1961, Transactions of the Eighth National Vacuum Symposium, etc., vol. 1 pp. 511–518.

LOUIS R. PRINCE, *Primary Examiner.*

S. C. SWISHER, *Assistant Examiner.*